US010187814B2

(12) United States Patent
McKibben (10) Patent No.: US 10,187,814 B2
(45) Date of Patent: Jan. 22, 2019

(54) SYSTEMS AND METHODS FOR HYBRID WIRELESS COMMUNICATION NETWORK

(71) Applicant: Cable Television Laboratories, Inc., Louisville, CO (US)

(72) Inventor: Bernard McKibben, Broomfield, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

(21) Appl. No.: 15/156,264

(22) Filed: May 16, 2016

(65) Prior Publication Data

US 2016/0338075 A1 Nov. 17, 2016

Related U.S. Application Data

(60) Provisional application No. 62/161,407, filed on May 14, 2015.

(51) Int. Cl.
| | | |
|---|---|---|
| H04W 24/00 | (2009.01) | |
| H04W 24/08 | (2009.01) | |
| H04L 25/00 | (2006.01) | |
| H04W 16/02 | (2009.01) | |
| H04W 88/08 | (2009.01) | |

(52) U.S. Cl.
CPC ............ *H04W 24/08* (2013.01); *H04L 25/00* (2013.01); *H04W 16/02* (2013.01); *H04W 88/085* (2013.01)

(58) Field of Classification Search
CPC ... G06N 99/002; G06N 99/005; H04W 16/02; H04W 24/08; H04W 88/085
See application file for complete search history.

(56) References Cited

U.S. PATENT DOCUMENTS

| | | | |
|---|---|---|---|
| 9,501,747 B2 * | 11/2016 | Roy ..................... | G06N 99/002 |
| 2007/0270658 A1 * | 11/2007 | Mitchell ............... | G09B 19/00 600/300 |
| 2008/0065573 A1 * | 3/2008 | Macready .............. | G06N 7/08 706/19 |
| 2009/0121215 A1 * | 5/2009 | Choi ..................... | G06N 99/002 257/31 |
| 2009/0144425 A1 * | 6/2009 | Marr ..................... | H04L 47/521 709/226 |
| 2011/0047201 A1 * | 2/2011 | Macready ............. | B82Y 10/00 708/446 |
| 2014/0025606 A1 * | 1/2014 | Macready ............ | G06N 99/002 706/12 |
| 2016/0171368 A1 * | 6/2016 | Aspuru-Guzik ..... | G06N 99/002 706/46 |
| 2016/0321559 A1 * | 11/2016 | Rose .................... | G06N 99/002 |
| 2017/0177534 A1 * | 6/2017 | Mohseni ............. | G06F 13/4068 |

* cited by examiner

*Primary Examiner* — Sai Aung
(74) *Attorney, Agent, or Firm* — Armstrong Teasdale LLP (57) ABSTRACT

A hybrid quantum-conventional computing system and method for analyzing band capture data and determining if a solution is an NP-hard problem or a polynomial time problem. The NP-hard problem is processed by a quantum computing system and the polynomial time problem is processed by a conventional computing system. The final result is an optimized radio resource management solution.

10 Claims, 6 Drawing Sheets

Detecting Signatures

FIG. 6 - Detecting Signatures

FIG. 7 - Detecting Traffic Patterns

SYSTEMS AND METHODS FOR HYBRID WIRELESS COMMUNICATION NETWORK

RELATED APPLICATIONS

This application claims priority to U.S. Provisional Application Ser. No. 62/161,407 (hereinafter "'407 provisional"), filed 14 Apr. 2015 and incorporated herein by reference.

BACKGROUND

Historically mobile networks have approach the use of spectrum in a number of different ways, and these approaches in part depended on the type of spectrum, e.g., exclusive use licensed spectrum, unlicensed spectrum, and non-exclusive use and multi-tiered priority incumbents. In some instances exclusive use licensed spectrum where only one network can exist in the band.

In other cases unlicensed spectrum is used, for example in regions of the world where there is no regulated or enforced protocol for unlicensed spectrum use. One examples of a network behavior in the unlicensed bands, which may result in interference and reduced performance, is a network designed for coexistence. One such example is Wi-Fi, which first sense a frequency channel for energy prior to transmitting. Alternatively, a network may sense certain MAC layer parameters for networks utilizing the same technology, but not across technologies. A network may assign one or more channels and applies traffic to one of those channels based on a determination, during the energy sensing process, that there is no energy detected on the channel. If energy is detected on a channel the network may back off for a period of time and attempt a transmission at a later time. Alternatively, a network may simply apply traffic to a band or channel with a configured duty cycle to avoid transmission collations. Still other networks may utilize frequency hopping to avoid interference.

In non-exclusive use and multi-tiered priority incumbent systems, a network polls a database for incumbent use or to determine an exclusion zone to determine if a band is available or not. If no higher priority incumbents are detected in this process, the network may apply traffic on the processed band.

Prior approaches for shared spectrum, as listed above, create interference and do not exploit underutilized spectrum in an efficient manner. The use of conventional computing does not afford the operator (1) the ability to detect both the PHY and MAC layers of other network types across wide bands of spectrum, (2) determine the regulatory priority of other networks in the band, (3) recognize traffic patterns of other networks and (4) dynamically assign frequencies and channels to mobile devices accordingly.

What is needed is a method for mobile networks to detect the PHY and MAC signatures of incumbent priority networks and other networks across wide bands of spectrum in order to assign their mobile devices to underutilized spectrum without creating interference, and without the need to poll databases or avoid exclusion zones. The network should be able to assign aggregated traffic channels to mobile devices using a set of non-contiguous frequency bands.

SUMMARY OF THE INVENTION

In an embodiment, the present hybrid quantum-conventional computational system advantageously allocates resources in a wireless communication system. The present system is formed with a feedback processing unit which analyzes band capture data and determining if an optimized resource management solution is a non-deterministic polynomial-time hard (NP-hard) or a polynomial time problem. The system further includes a conventional computing system for processing the polynomial time problem and a quantum computing system for processing the NP-hard problem. The quantum computing system receiving qubit data from a quadratic unconstrained binary optimization (QUBO) unit for translating conventional binary data to quantum bits (qbits). A problem-type processor transmits the binary NP-hard problem data to the QUBO for translation into qbit data for processing by the quantum computing system and for transmitting the polynomial time problem to the conventional computing system.

BRIEF DESCRIPTION OF THE INVENTION

DETAILED DESCRIPTION OF THE FIGURES

Acronyms, abbreviations, and initialisms:
RRH—remote radio head
BBU—base band unit
BS—base station
AP—access point
MIMO—multiple input multiple output
RAN—radio access network
STA—station
PU—processing unit
Qbit (also called qubit)—a quantum bit
LTE—long-term evolution
HFC—hybrid fiber-coax
NP-hard (problem)—non-deterministic polynomial-time hard (problem)
MINLP—mixed integer nonlinear problem
QSAP—quadratic semi-assignment problem
QUBO—quadratic unconstrained binary optimization A hybrid quantum-convention computing architecture combines the benefits of a quantum computing system and a conventional computing system as applied to the dynamic allocation of frequency for communication systems, for example, wireless communication systems. The present system and method may be applied across wide band set of exclusive use spectrum bands, licensed non-exclusive use spectrum bands, and/or unlicensed spectrum bands.

One objective of the present system and method is to provide mobile operators with the capability to use underutilized spectrum in order to deliver broadband wireless service having near zero interference with other networks occupying the band. In an embodiment, all spectrum processed by the present hybrid architecture may be fully utilized. The present hybrid architecture is configured to detect signatures associated with a plurality of networks, systems, and devices in, for example, one or more shared spectrum band, either licensed or unlicensed. Detecting signatures may be done on a continual basis or near continuous basis. Furthermore, the present system and method may deterministically assign one or more frequencies to mobile devices based upon, for example, current use and any regulatory network priority assigned to the signature(s). Frequencies are assigned in real-time as networks, for example incumbent networks and non-incumbent networks, sharing the band alter band utilization. In the present system and method there is no need for a mobile network to access a centralized databases for incumbent band utilization as is currently done, or to strictly adhere to exclusion zones occupied by lower utilized, high priority incumbents.

Figure 1:
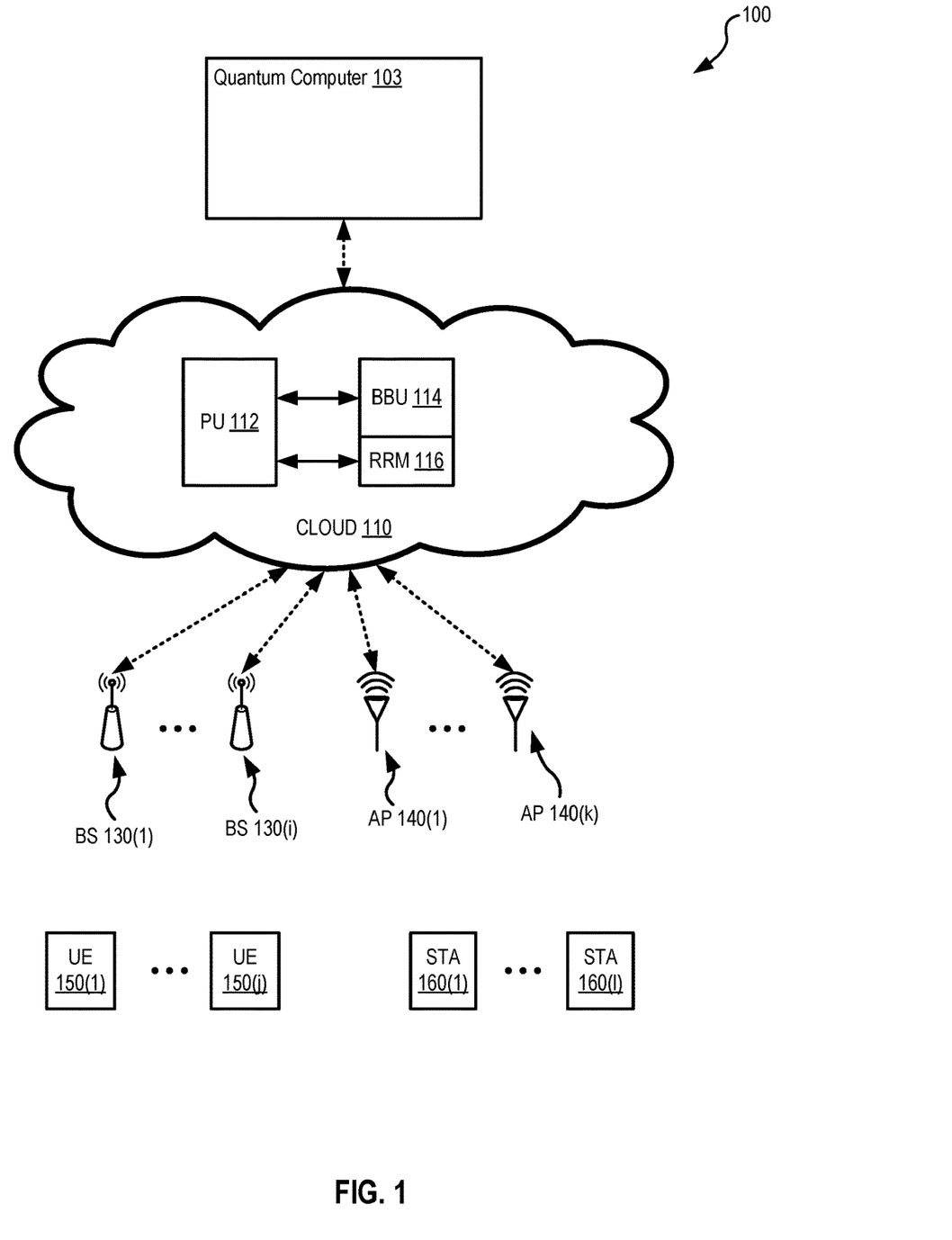
FIG. 1 shows one hybrid computing system associated with a cloud Radio Access Network (RAN) network, in an embodiment.

FIG. 1 shows one exemplary hybrid quantum-conventional system 100 associated with a cloud Radio Access Network (RAN) network.

System 100 includes a quantum computer system 103, a conventional cloud processing system 110, a plurality of base stations (BS) 130(1)-130(i), a plurality of access points (APs) 140(1)-140(k), a plurality of user equipment devices (UEs) 150(1)-150(j), and a plurality of stations (STAs) 160(1)-160(l).

Cloud system 110 further includes a processing unit (PU) 112 in communication with a base band unit (BBU) 114 and a radio resource management system (RRM) 116. Cloud system 110 may also include or be in communication with a data store (not shown). In an embodiment, cloud processing system 110 is a plurality of cloud processing systems 110(1)-110(q). A generic term used herein for both BSs 130 and APs 140 is remote radio head (RRH), as known in the art.

A base station, like BSs 130, is an LTE/cellular specific implementation of a remote radio head. An access point, like APs 140, is Wi-Fi specific implementation of a remote radio head. As such remote radio head is used herein to describe base stations 130, access points 140, and other types of remote radio heads herein. In an embodiment remote radio heads support a plurality of technologies such that one remote radio head is configured with at least an LTE/cellular bastions and a Wi-Fi access point. The remote radio heads are in communication with cloud 110. Communication may be wired, optical, wireless, or a combination thereof, e.g. HFC.

User Equipment, like UEs 150, is an LTE/cellular specific implementations of a client. A station, like STAs 160, is Wi-Fi specific implementation of a client. As such client is used herein to describe UEs 150, STAs 160, and other types of technology specific clients herein. Clients, such as UEs 150 and STAs 160, may be in wireless communication with one or more remote radio heads, such as BSs 130 and APs 140. Some clients may support a plurality of communication technologies such that a single client may be in communication with more than one remote radio head and may communicate simultaneously across technologies. For example, UE 150(1) may support both LTE and Wi-Fi such that, for example, UE 150(1) simultaneously communicates with BS 130(1) and AP 140(1), and UE 150(2) simultaneously communicates with BS 130(1)-(3) and APs 140(2)-(6).

For dynamic frequency allocation, remote radio heads scan and sample wide spectrum band ranges, for example, from 400 Mhz to 100 Ghz. The samples are sent to the conventional cloud 110 processing unit 112 and the quantum computing 103.

Quantum computers are well suited for pattern recognition and solution optimizations. As such quantum computer 130 is utilized in the present system to identify network signatures (also called herein "patterns" and "waveforms") in the captured band data. Each wireless network generates a unique waveform or signature which may include or support, for example, certain channel frequency, multiple access methodologies (TDMA, CDMA, OFDMA, etc.), modulation coding schemes, system specific MAC layers, etc. Quantum computer 103 is capable of detecting and distinguishing each signature present within a band. Quantum computer 103 processes samples continuously, for example, every 100 ms. This is shown and discussed in greater detail in FIG. 5 and its associated description, below. By doing so quantum computer 103 is capable of identifying the network present in shared spectrum bands (licensed or unlicensed), and traffic patterns present in the band over multiple samples. This then allows quantum computer 103 to optimize channel selection for the operator's network and mobile devices transmissions.

Quantum computer 103 sends the identified network signature(s), traffic pattern(s) and recommended channel selection(s) to the conventional computing system, cloud 110. Cloud 110 then assigns priority to each network based upon, for example, regulations. Cloud 110 then performs a waveform adaptation to the selected set of frequencies to each of its mobile devices based upon the networks and traffic patterns identified by quantum computer 103. Cloud 110 then manages the baseband functions for uplink and downlink channels to its associated mobile devices, e.g., UEs 150 and STAs 160, until cloud 110 receives its next input from the quantum computer.

A quantum computer may be advantageously used in the present system and method to identify PHY and MAC signatures of a variety of networks, to identify traffic patterns from a variety of networks, to link cognitive radios to quantum computers in order to identify network signatures, to apply quantum computing process to a cloud RAN architecture applied to spectrum sharing, and for cooperation with a conventional computer, such as conventional cloud computing system 110, to dynamically assign frequencies to mobile devices/clients.

Hybrid Conventional and Quantum Based Architecture for Heterogeneous Wireless Networks:

The present system, as shown in FIG. 1, may be advantageously utilized in a heterogeneous wireless network, as described here, by coupling a conventional computing system with a quantum computing system. Such a system and its associated methods may be arranged to provide an analysis of the various complex factors that impact wireless deployments for the purpose of enabling real-time radio global resource management and optimization decisions for heterogeneous wireless networks.

A heterogeneous network is configured with one or more remote radio heads, such as macro base stations (e.g., BS 130), residential and public access points (e.g., APs 140), as well as femto cells and/or any other pre-planned or unplanned element in the radio access network. These enable connectivity to the end points, referenced as user equipment. Examples include mobile phones, tablets, computers etc.

Quantum computer 103 is in communication with the cloud system 110, creating a hybrid quantum-conventional computing system. The advantages of this hybrid quantum-conventional computing architecture include:

- Computational problems in the present hybrid system may be directed to the processing system (quantum or conventional), based on which processing system is best suited to tackle the particular problem or aspect of the problem. For example, a quantum processing systems are better suited for non-deterministic polynomial-time hard (NP-hard) problems, while conventional computational systems are for polynomial time problems (see below for additional details). This can minimize processing cost and setup, and enable an organic progression from conventional to quantum computating.
- Enabling the effective use of advancements in machine-learning and deep-learning techniques for predictive wireless network operations
- Overcoming real-time constraints (e.g., processing time) imposed by quantum computers by converting a NP-hard computing problem into a linear storage problem, via the use of "profiles" (see below).

Adapting a hybrid quantum-conventional computing system into a wireless network in this way produces an adaptable, intelligent, heterogeneous wireless network. To better understand this, we provide information on radio resource management parameters in the next section.

Radio Resource Management Parameters:

Device selected transmission parameters not only impacts the devices performance but may also influence the performance of other devices that utilize the same radio access technology and/or different radio access technology. Example of such parameters include but are not limited to power level, operation channel, and transmitted waveform. For globally optimum performance it can be advantageous to have a "centralized" entity with sufficient information regarding all discoverable network elements, the different radio access technologies, and their operating conditions. Such a centralized entity can optimally choose the transmission parameters of the network elements in the radio access network. In addition, the centralized entity may also perform signal processing on a multiplicity of signal data received from the network elements that lead to a globally optimum performance. That is, the centralized entity may by itself or jointly with associated computational elements, determine the transmit signal characteristics for multiplicity of RAN elements.

The parameters chosen by elements in the radio access network are adapted either on a short time scale, for example in the order of a transmission frame time, or are adapted on a longer time scale, for example in the order of seconds or minutes. Examples of short time scale parameters include, but are not limited to, a transmitted waveform communicated between the $i^{th}$ base station and the $j^{th}$ UE, which is denoted as $S_{ij}(t)$ in FIG. 2. Examples of long term scale parameters include, but are not limited to, base station transmit power ($P_i$) and resources allocated to the base station ($C_{ij}$), see FIG. 2.

Figure 2:
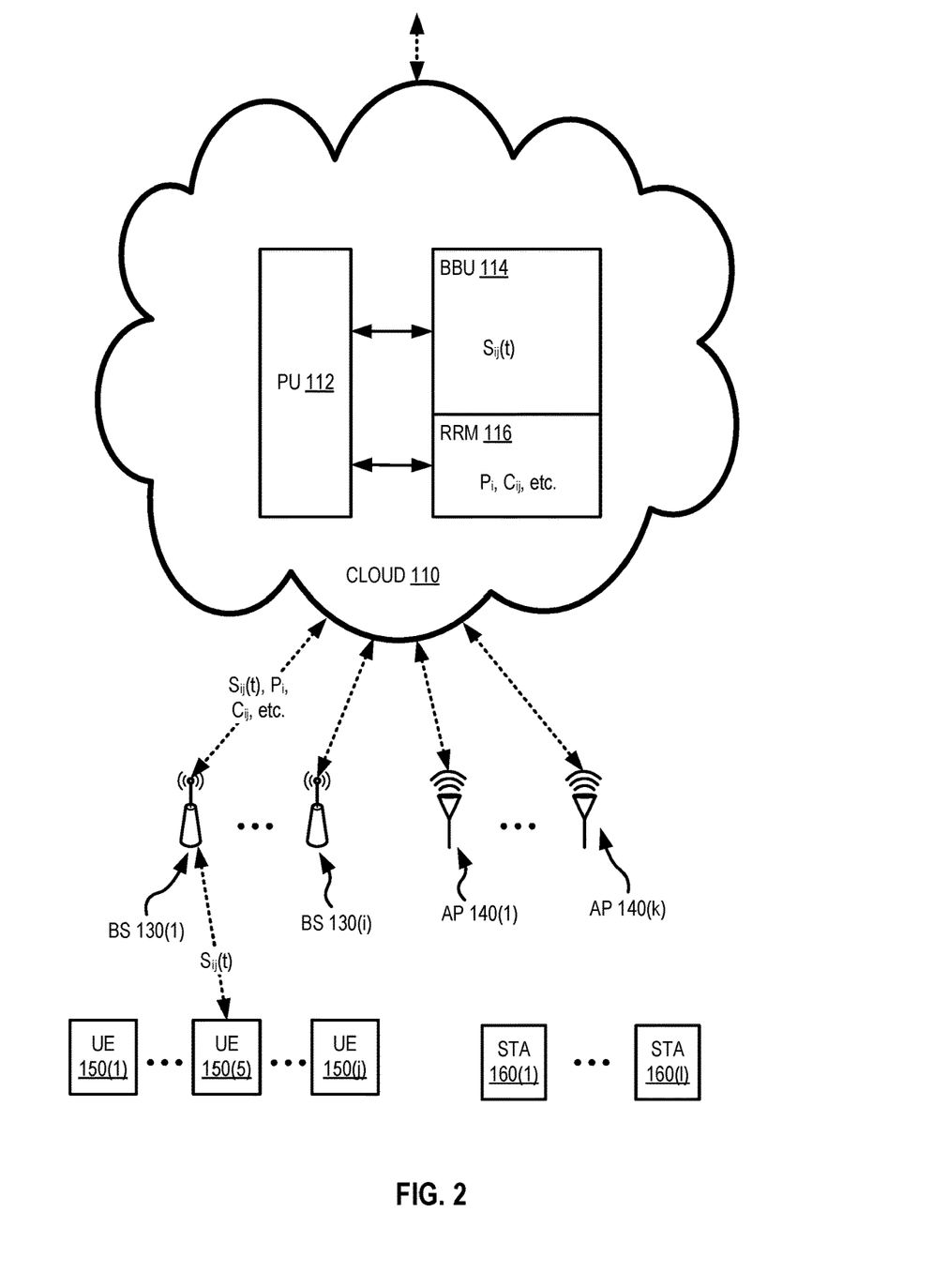
FIG. 2 shows the non-quantum portion of the hybrid computing system in a cloud RAN network from FIG. 1, in an embodiment.

$S_{ij}(t)$, ($P_i$) and $C_{ij}$ are communicated between RRMs 130, 140 and cloud 110 for processing. In an embodiment, $S_{ij}(t)$ is processed by BBU 114 and ($P_i$) and $C_{ij}$ are processed by RRM 116.

Figure 3:
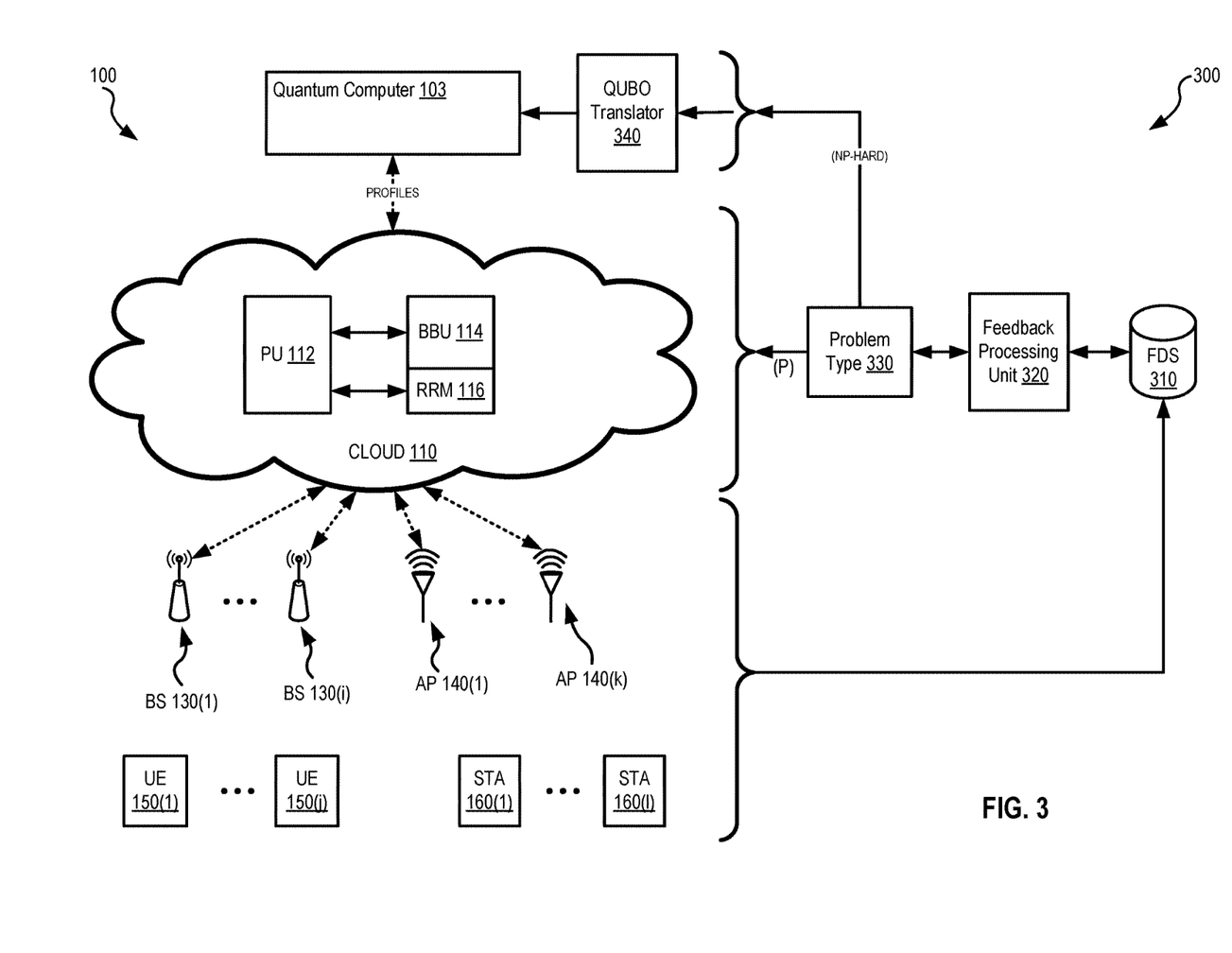
FIG. 3 shows the hybrid computing system in a cloud RAN network from FIG. 1 with the addition of a feedback flow, in an embodiment

The design of a wireless network, such as that shown in FIGS. 1, 2, and 3, is dependent on various factors, such as the geography, population density, anticipated wireless sessions, etc. In addition to these static data points, wireless networks can be designed to take into consideration dynamic factors, such as real-time traffic patterns, weather, location specific data (e.g., terrain, altitude, orientation of a UE), etc. Designs may even take into consideration the movement of UEs at any given time. All of this can be done utilizing predictive analysis based on macro trends (e.g., traffic patterns, etc.) and micro-trends (e.g., user schedules, user travel based on map software, etc.). This data is available on many UEs today. All that is needed is to process the micro and macro trends effectively and in real-time, although such processing is an NP-hard problem. NP-hard problems are a challenge for conventional computers to compute in realistic time frames (see below). The present system and method takes into considerations and sends NP-hard problems to the quantum computational aspect of the present system, such as quantum computer 103, and polynomial time problems are sent to a conventional computer system, such as cloud 110.

FIG. 3 is a feedback processing system 300 shown in block diagram format. System 300 includes a feedback data store, (FDS) 310, a feedback processing unit (FPU) 320, and a problem type processor 330. FDS 310 is used to collect data from the various sources. Collect data includes real-time performance data from the network, user profile data, and various external data, such as weather data, location data, traffic data, etc.

FPU 320 receives the data from FDS 310 and pre-analyzes the data and cooperates with problem type processor 330 to determine if and how to split the data for quantum processing or conventional processing. The former results in new or refined network profiles. The latter results in a selection among the existing profiles, for example, which already exist in cloud 110. If FDU 320 and problem type processor 330 determine that a problem is a polynomial time problem (P-type problem) that problem is sent to the conventional computer system, such as cloud 110. If the problem is determined to be an NP-hard problem, that problem is sent to the quantum computing system, such as quantum computing system 340.

In an embodiment, an NP-hard problem is translated into a special kind of NP-hard problem call QUBO (quadratic unconstrained binary optimization) in a polynomial time, It will be understood by one skilled in the art that NP-hard problems may be translate to a different NP-hard problem in polynomial time, which are amenable to be solved by quantum computational processes. Optional QUBO translator 340 is shown connecting problem type processor to quantum computer 103 is FIG. 3.

Figure 4:
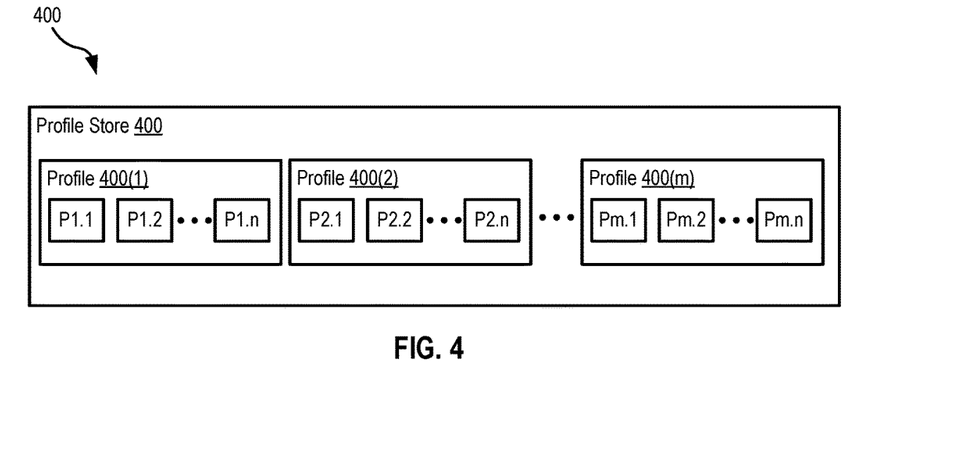
FIG. 4 is a block diagram illustrating one exemplary profile set, in an embodiment.

Network Profiles:

As previously discussed, embodiments herein utilize quantum computer systems and architecture for solving computationally complex problems for predictive wireless network configurations. However, this requires the quantum computer systems do perform real-time processing. Real-time processing in quantum computer systems is both very expensive and currently very challenging since quantum computers suffer from delays associated with annealing, which result in a less than-desired latency. To rectify this, the present system and method utilizes the quantum computer system to (1) create network configuration profiles and (2) refine or create additional sub-profiles. FIG. 4 is a block diagram illustrating one exemplary profile set, in an embodiment. Profiles are pictorially represented in FIG. 4 as stored profile store 400. Profile store 400 includes a plurality of profiles profile 400(1) through profile 400($m$), each of which includes sub-profiles. Profile 400(1) includes sub-profiles P1.1 through P1.$n$, profile 400(2) includes sub-profiles P2.1 through P2.$n$, and profile 400($m$) includes Pm.1 through Pm.n.

In one example of profiles and sub-profiles, profile 400(7) may be for a time interval 7a-8a, and profile 400(8) may be for a time interval 8a-9a. Sub-profile P7.1 may be for a first snow sub-profile, sub-profile P7.2 may be for a second snow sub-profile, sub-profile P7.3 may be for a first rain sub-profile, etc. More complex sub-profiles may be formed as the combination of other sub-profiles. For example a sub-profile may be formed by combining a first snow sub-profile, a rush hour traffic sub-profile, a peak sunspot sub-profile, etc. As can be seen, any aspect that can effect RF transmission may be quantified into a sub-profile. In addition, the degree of orthogonality between sub-profiles may also be quantified and included in a sub-profile that is the combination of other sub-profile or sub-profile aspect(s).

The present system and method generates network configuration profiles, for example, one for each different combination of the various static and dynamic factors (e.g., anticipated traffic patterns, weather, sunspots, etc.), for the different network configuration scenarios that are consider. It also generates sub-profiles to handle potential real-time changes within the scope of a specific profile. One example of a sub-profile is one that takes into consideration a traffic accident on a major artery such that a road closure occurs. These sub-profiles are designed to cover a certain percentage of plausible conditions (e.g., 90%) for an associated profile. Additional sub-profiles may be generated or refining existing sub-profiles, e.g., based on new information as it becomes available. For instance, as traffic patterns change, city landscape changes, weather changes, etc.

Description of NP-Hard-Ness of the Problem:

The problem of optimum resource allocation among the RAN elements using a centralized coordinator translates to a mixed integer nonlinear problem (MINLP) when the number of coordinated RAN elements is small and to a quadratic semi-assignment problem (QSAP) when the number of coordinated RAN elements is relatively large. Both of these problems are NP-hard problems. In other words, the computation time to find the optimum value for the aforementioned optimization problem exponentially grows with the number of decision variables. Even using conventional computers with multi-core processors is not sufficient for solving these problems and requires length processing times, resulting in long processing delays. This will be problematic especially for applications that require real-time or semi real-time processing. Quantum computers on the other hand are highly optimized to solve the NP-hard problems. Although due to physical constraints, there is a minimum processing delay to solve these problems, the amount of delay is bounded and does exponentially grow with the size of problem.

As discussed previously, the optimization problem can be divided into two separate problems: a first aspect that is not NP-hard but may still require some substantially real-time adaptation (e.g., transmitted waveform adaptation) and a second (or more) aspect that is NP-hard but the where the optimal solution varies more slowly with time (e.g., adaptation of power, operation channel, carrier sense threshold, etc.). Conventional computers may be used to solve the former while quantum computer can be used to solve the latter problem.

Figure 5:
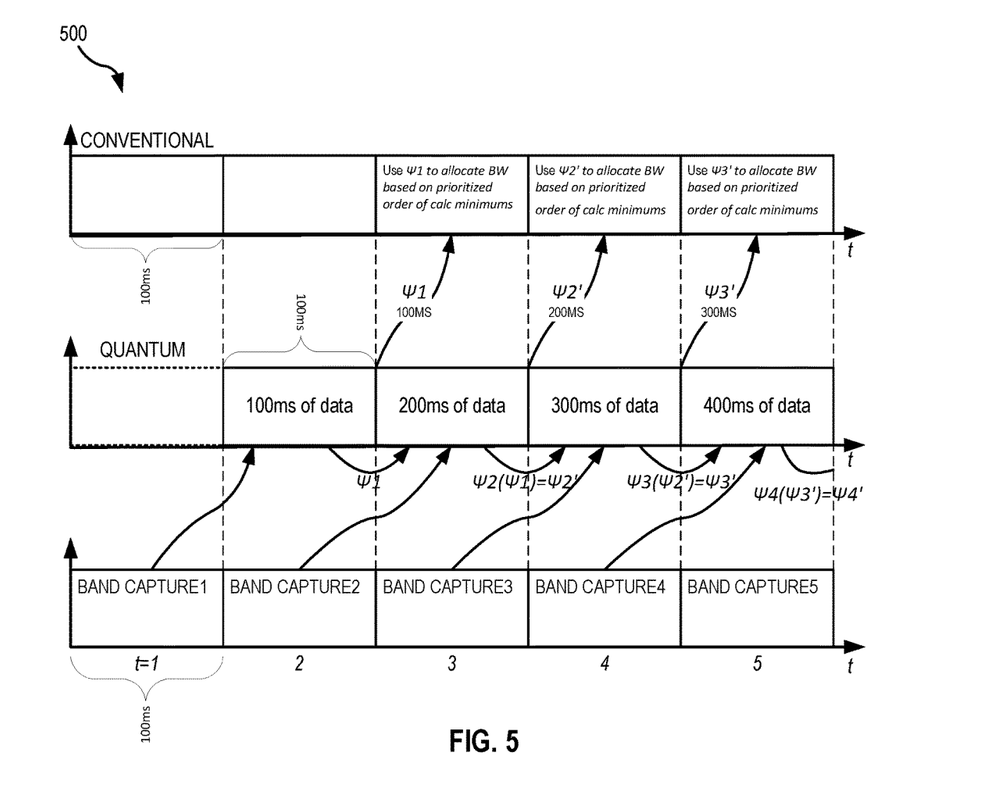
FIG. 5 is a processing diagram showing band capture, quantum processing, and convention processing, in an embodiment.

FIG. 5 is a processing diagram 500 showing band capture, quantum processing, and convention processing, in an embodiment. Processing diagram 500 is divided into 5 processing steps, each 100 ms in length. 100 ms is selected here as an exemplary amount for a quantum computing system to produce a processing result.

The basic process includes capturing 100 ms of data, processing the band captured data by the quantum computing system to generate a minimum or set of minimums, for example, MIMO coefficients for minimum noise, then send the results to the conventional computing system to allocate bandwidth. It will be understood that the minimum or set of minimums may be local minimums or may be global minimums. Prior to or during the transmission to the quantum computing system the data may be translated from a convention n by m matrix into a x by y qubit matrix. Prior to or during the transmission from the quantum computing system to the conventional computing system the data may be translated from a x by y qubit matrix back to a convention n by m matrix.

At time step t=1 a band capture system captures band capture 1. Band capture 1 data is sent to the quantum processing unit and in time step t=2 the band capture system captures band capture 2 and the quantum processing system generates a minimum or set of minimum MIMO coefficients for minimum noise packaged as $\Psi_1$. Band capture 2 data is then sent to the quantum computing system and a copy of $\Psi_1$ is then sent to the conventional computing system. A copy of $\Psi_1$ is also saved within the quantum computing system for processing with results from quantum computing system processed band capture 2 data.

The band capture system, at time step t=3, captures band capture 3 data. The quantum computing system, at time step t=3, processes band capture data 2 to generate $\Psi_2$ as a function of $\Psi_1$ to produce $\Psi'_2$, that is: $\Psi_2(\Psi_1)=\Psi'_2$. Thus the quantum computing system has processed 200 ms of data at time step t=3. By processing the current set of minimum MIMO coefficients as a function of historical data the most recent data may converge more quickly to the best solution as time goes on. The conventional computing system, at step t=3, allocated bandwidth data based on the $\Psi_1$ data. Band capture 3 data is then sent to the quantum computing system and a copy of $\Psi'_2$ data is sent to the conventional computing system.

The bandwidth capture system, at time step t=4, captures band capture 4. The quantum computing system, at time step t=4, processes band capture data 3 to generate $\Psi_3$ as a function of $\Psi'_2$ to produce $\Psi'_3$, that is: $\Psi_3(\Psi'_2)=\Psi'_3$. Thus the quantum computing system has processed 300 ms of data at time step t=4. The conventional computing system, at step t=4, allocated bandwidth data based on the $\Psi'_2$ data. Band capture 4 data is then sent to the quantum computing system and a copy of $\Psi'_3$ data is sent to the conventional computing system.

The bandwidth capture system, at time step t=5, captures band capture 5. The quantum computing system, at time step t=5, processes band capture data 4 to generate $\Psi_4$ as a function of $\Psi'_3$ to produce $\Psi'_4$, that is: $\Psi_4(\Psi'_3)=\Psi'_4$. Thus the quantum computing system has processed 400 ms of data at time step t=5. The conventional computing system, at step t=5, allocated bandwidth data based on the $\Psi'_3$ data. Band capture 4 data is then sent to the quantum computing system and a copy of $\Psi'_3$ data is sent to the conventional computing system.

In an alternative embodiment, the quantum computing system only processes the most recent band capture data.

In still another embodiment, the quantum computing system processes data as described above for FIG. 5, and additionally processes the most recent band capture data for error correction purposes.

Figure 6:
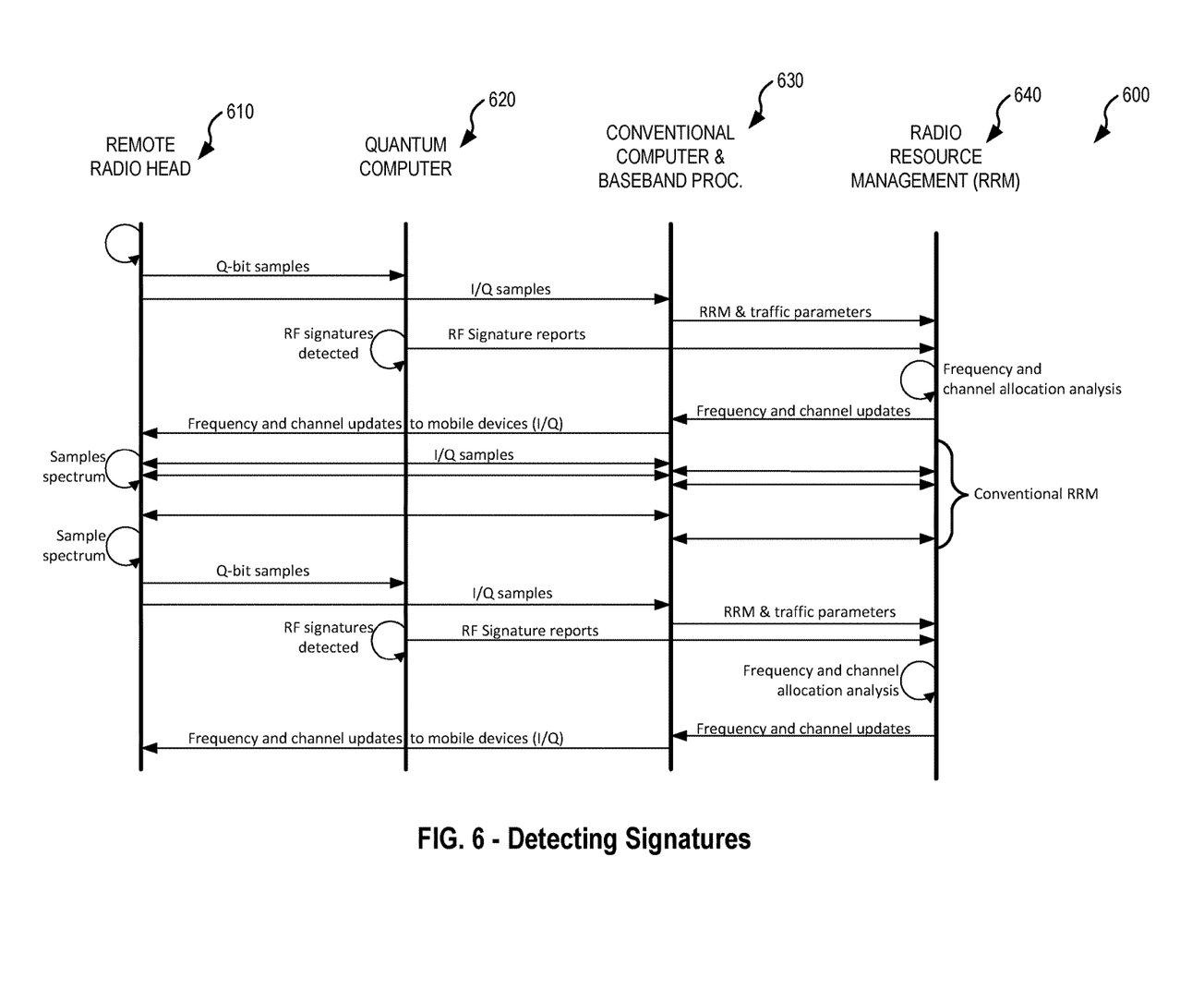
FIG. 6 is a communication diagram in a signal detection embodiment.

FIG. 6 is a communication diagram 600 in a signal detection embodiment. Communication devices in FIG. 6 include a remote radio head (RRH) 610, a quantum computer 620, a conventional computer implemented with baseband processor 630, and a radio resource management 640. In system 600 time increases from the top of the communication diagram to the bottom of the diagram.

First, the remote radio head transmits Qbit samples to the quantum computer and I/Q samples to the conventional computer. The conventional computer then transmits RRM and traffic parameters to the RRM. The quantum computer then detects the RF signatures from the Qbit samples and sends an RF signature report to the RRM. The RRM performs a frequency and channel allocation analysis and reports RRH with the frequency and channel update data for its associated mobile devices, (see FIG. 1).

The RRH then samples the spectrum and communicates I/Q samples to the conventional computer, which communicates with the RRM system in the conventional manner.

The RRH then provides Qbit samples to the quantum computer and I/Q samples to the conventional computer. The conventional computer transmits RRM and traffic parameter data to the RRM. The quantum computer again detects RF signatures and reports the RF signatures to the RRM, which performs a frequency and channel allocation analysis and transmits frequency and channel updates to the conventional computer. The conventional computer then transmits the frequency and channel updates to the RRH for use with its associated mobile devices.

Figure 7:
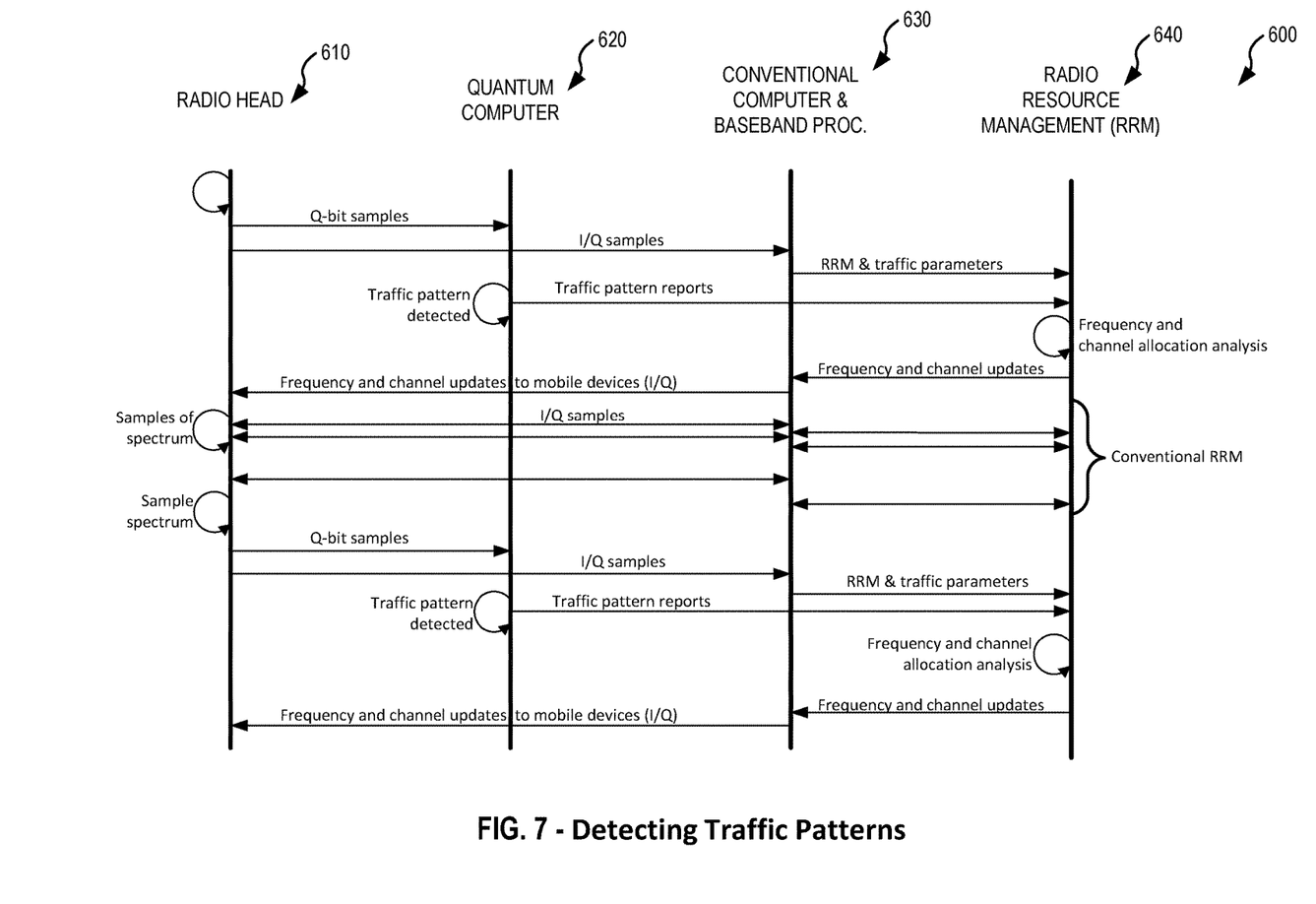
FIG. 7 is a communication diagram in a traffic pattern detection embodiment.

FIG. 7 is a communication diagram 700 in a traffic pattern detection embodiment. Communication devices in FIG. 7 include remote radio head (RRH) 610, quantum computer 620, conventional computer implemented with baseband processor 630, and radio resource management 640. In system 700 time increases from the top of the communication diagram to the bottom of the diagram.

First, the remote radio head transmits Qbit samples to the quantum computer and I/Q samples to the conventional computer. The conventional computer then transmits RRM and traffic parameters to the RRM. The quantum computer then detects the traffic patterns from the Qbit samples and sends a traffic pattern report to the RRM. The RRM performs a frequency and channel allocation analysis and reports RRH with the frequency and channel update data for its associated mobile devices, (see FIG. 1).

The RRH then samples the spectrum and communicates I/Q samples to the conventional computer, which communicates with the RRM system in the conventional manner.

The RRH then provides Qbit samples to the quantum computer and I/Q samples to the conventional computer. The conventional computer transmits RRM and traffic parameter data to the RRM. The quantum computer again detects traffic patterns and reports the traffic patterns to the RRM, which performs a frequency and channel allocation analysis and transmits frequency and channel updates to the conventional computer. The conventional computer then transmits the frequency and channel updates to the RRH for use with its associated mobile devices.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A wireless communications system, comprising:
   a feedback processing unit for analyzing captured bandwidth data from a remote radio head;
   a problem-type processor in operable communication with the feedback processing unit, and configured to (i) analyze the captured bandwidth data to determine whether the captured bandwidth data presents one of a computational polynomial time problem and a non-deterministic polynomial-time hard (NP-hard) problem, and (ii) transmit problem-specific data based on the determination, wherein the problem-specific data comprises binary data information;
   a communications processor in operable communication with the problem-type processor, and configured to process polynomial time problem data from the transmitted problem-specific data;
   a quantum computer in operable communication with the problem-type processor, and configured to process NP-hard problem data received from the transmitted problem-specific data; and
   a quadratic unconstrained binary optimization (QUBO) unit interposed between the problem-type processor and the quantum computer,
   wherein the QUBO unit is configured to translate the binary data information of the NP-hard problem data from the problem-type processor in two qbit data information for processing by the quantum computer.

2. The system of claim 1, wherein the communications processor comprises a cloud computing system.

3. A wireless communications system, comprising:
   a feedback processing unit for analyzing captured bandwidth data from a remote radio head;
   a problem-type processor in operable communication with the feedback processing unit, and configured to (i) analyze the captured bandwidth data to determine whether the captured bandwidth data presents one of a computational polynomial time problem and a non-deterministic polynomial-time hard (NP-hard) problem, and (ii) transmit problem-specific data based on the determination, wherein the problem-specific data comprises binary data information:
   a communications processor in operable communication with the problem-type processor, and configured to process polynomial time problem data from the transmitted problem-specific data:
   a quantum computer in operable communication with the problem-type processor, and configured to process NP-hard problem data received from the transmitted problem-specific data; and
   a quadratic unconstrained binary optimization (QUBO) unit interposed between the problem-type processor and the quantum computer, wherein the QUBO unit is configured to transmit the binary data information of the polynomial time problem to the communications processor without translation.

4. The system of claim 1, wherein the captured bandwidth data includes one or more of real-time performance data from the remote radio head, user profile data, and external data.

5. The system of claim 1, wherein the NP-hand problem comprises one or more of a mixed integer nonlinear problem (MINLP) and a quadratic semi-assignment problem (QSAP).

6. The system of claim 1, wherein the captured bandwidth data includes at least one 100 ms sample of captured data.

7. The system of claim 1, wherein the captured bandwidth data includes a set of minimums.

8. The system of claim 7, wherein the set of minimums includes one or more of MEMO coefficients, a local minimum, or global minimums.

9. The system of claim 1, wherein the quantum computer is configured to identify at least one network signature from the captured bandwidth data.

10. The system of claim 9, wherein the communications processor is configured to receive the at least one identified network signature from the quantum computer and assign a priority to at least one network corresponding to the identified network signature.

\* \* \* \* \*